July 30, 1946. R. H. POTTS Re 22,775
TREATING FATTY ACID-CONTAINING STOCK
Original Filed Oct. 9, 1939
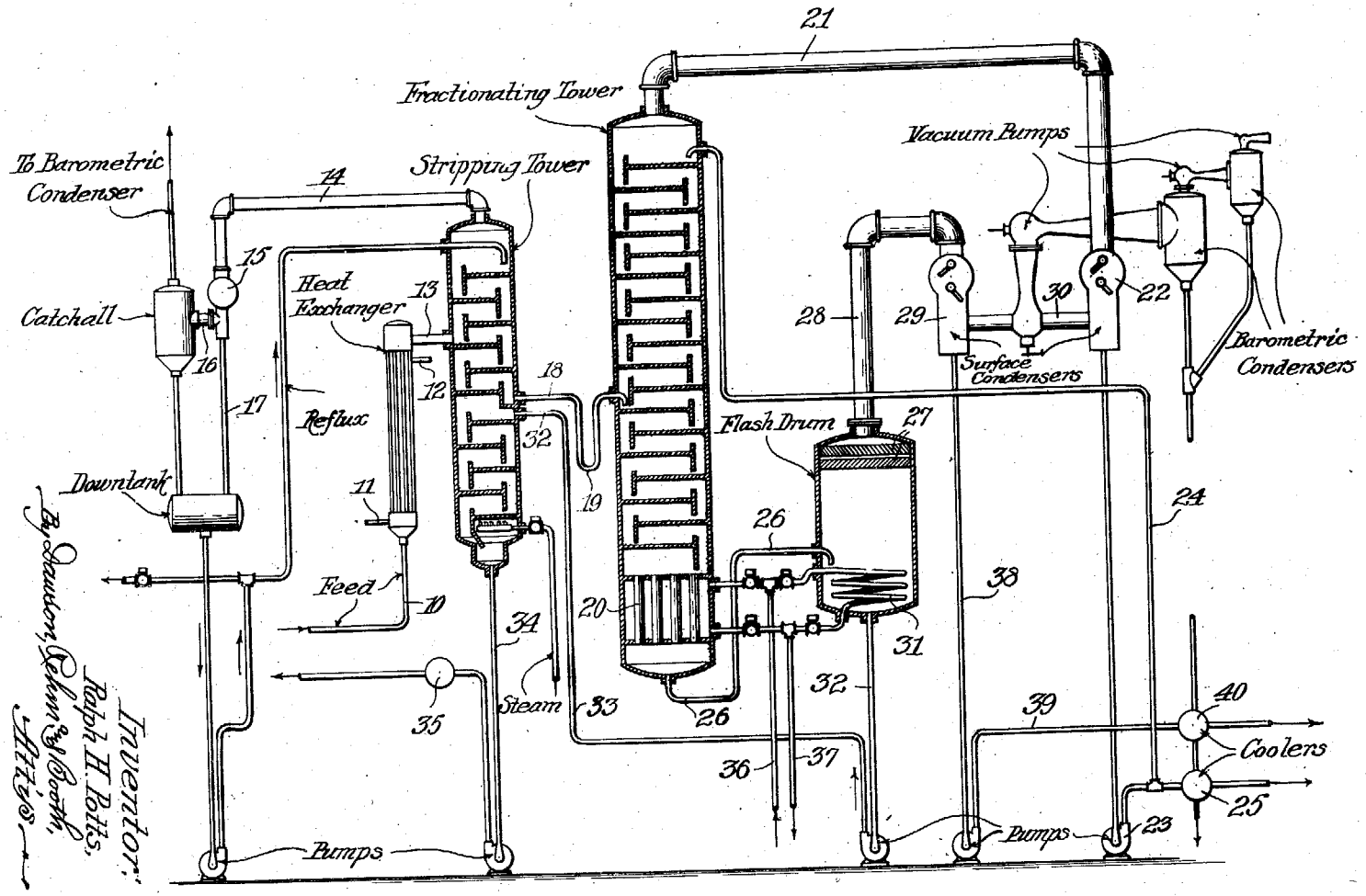

Reissued July 30, 1946

Re. 22,775

UNITED STATES PATENT OFFICE 22,775

TREATING FATTY ACID-CONTAINING STOCK

Ralph H. Potts, La Grange, Ill., assignor to Armour and Company, Chicago, Ill., a corporation of Illinois Original No. 2,322,056, dated June 15, 1943, Serial No. 298,722, October 9, 1939. Application for reissue February 10, 1945, Serial No. 577,252

16 Claims. (Cl. 202—53)

This invention relates to treating fatty acid-containing stock and the like. The new method will be found to be applicable to other uses.

It is now common practice to pass fatty acid-containing stock through a pipe still and thence into a fractionating tower, steam being employed in the bottom of the tower for stripping the bottoms, the steam and the uncondensed portion of the stripped vapors passing up and out of the tower. This process has several disadvantages. The volume of the steam, air and other gases introduced with the feed stock makes it difficult to maintain the desired high vacuum. Furthermore, the ascending steam and gases, by reason of molecular weight differences and through entrainment, militate against sharp separation of the fractions. The presence of air and low boiling fractions tends to produce decomposition and discoloration. The non-uniform content of moisture within the feed stock produces an additional steam load in the fractionating tower and surging due to varying amounts of moisture.

An object of the present invention is to produce a sharp separation of the fractions within the fractionating tower through the exclusion of steam and such gases, and, in general, to overcome the disadvantages above referred to. A further object is to improve yields, insure closer cut fractions of improved odor and color, prevent decomposition of the unsaturated fractions, and reduce operating costs. A further object is to provide a method in which the steam which is necessary for stripping the bottoms is substantially excluded from the fractionating tower, the same steam which is employed for stripping together with the stripped vapors being utilized for deaerating the incoming feed stock, removing the moisture thereof, and the low boiling fraction containing odoriferous substances. A still further object is to provide a method in which the bottoms from the fractionating tower are withdrawn and stripped of vapors at low temperatures, the stripped vapors being returned without substantial heat loss to the fractionating tower. Other objects and advantages will appear as the specification proceeds.

The invention is illustrated, in a preferred embodiment, by the accompanying drawing in which the single figure represents, in a diagrammatical manner, apparatus suitable for carrying out the improved process.

The process may be described broadly, in connection with the apparatus, as follows. The feed stock containing fatty acids enters through pipe 10 into the heat exchanger, or other suitable form of heater. In the heat exchanger shown, a heating fluid such as a Dowtherm may be passed through the inlet pipe 11 and out of the exchanger through the pipe 12, the pipes leading to a suitable external heating source (not shown). From the heat exchanger, the stock flows through pipe 13 into the stripping or fractionating tower at about the middle of its top section. As the stock flows downwardly, it meets a rising column of steam and vapors from the bottom of the tower, the steam and vapors aiding in the removal of air and moisture from the feed stock. At the same time, there is removed a small fraction, about five per cent, of low boiling fatty acids and other odoriferous substances.

The stripping or fractionating tower described serves the function not only of stripping vapors from the bottoms, but also of fractionating the rising column of vapors.

The steam, air and vapors thus withdrawn pass through the pipe 14 and surface condenser 15, the steam passing into the catchall through pipe 16 and the condensed fatty acid vapors passing downwardly through pipe 17 into the down tank. The steam in the catchall passes upwardly to a barometric condenser (not shown), by means of which, the pressure on the stripping tower is maintained at about 50 mm. Hg.

From the down tank, the condensate flows into a pump and about two-thirds of it is returned by the pump to the top of the stripping tower as reflux, the remaining one-third being removed as product.

The de-aerated and dried feed stock then flows through the pipe 18, which provides a seal 19, into the fractionating tower. Preferably, the top portion of the tower is maintained at a pressure of 2 mm. Hg and the pressure at the base is not greater than 32 mm. Hg. The bottom of the fractionating tower is heated by a Dowtherm Calandria type of base heater 20.

The vapors from the top of the tower pass off through pipe 21 and are condensed in the surface condenser 22. The major portion of the distillate from the condenser 22 is returned by the pump 23 through line 24 to the top of the fractionating tower as reflux. A smaller portion passes through cooler 25 to a point of recovery.

Bottoms from the tower flow through the pipe 26 into the flash drum or chamber where the vapors, after passing through the entrainment eliminators 27, pass through pipe 28 and are condensed in the surface condenser 29. The condensers 22 and 29 are connected by a manifold pipe 30 and a vacuum is maintained therein through the use of vacuum pumps and barometric condensers of well-known structure.

The flash drum is provided with a heating coil 31 connected with the Dowtherm pipes, suitable valves being placed in the lines permitting the coil to be used when desired. In ordinary practice, it is found unnecessary to heat the bottoms within the flash drum. The bottoms from the flash drum are withdrawn through pipe 32 and pumped through pipe 33 to a lower portion of the stripping tower. As the bottoms flow downwardly over the trays in the tower, they meet the ascending steam which strips the bottoms. The unvaporized portion of the bottoms is withdrawn through pipe 34 and passed through a cooler 35 to a point of recovery.

It will be noticed that the Dowtherm vapor or other suitable heating fluid is circulated through pipes 36 and 37 and through valve controlled pipes leading into the base heater 20 and the coil 31, the valves permitting the application of heat to be accurately controlled in the fractionating tower and in the flash drum.

The distillate which is recovered from the flash drum condenser 29 passes downwardly through pipe 38 and is then pumped through line 39 and cooler 40 to a point of recovery.

*Specific operation*

In order to illustrate the operation of the method, a specific example may be given as follows.

Five thousand pounds per hour of acidulated cotton seed foots containing from 80 per cent to 85 per cent of free fatty acids (150° F.), enters the heat exchanger through the pipe 10 and is brought up to a temperature of 450° F. within the heat exchanger or heater. The stock enters the stripping tower and passes down over a series of stripping trays where it is met by a counter current of stripping steam, the pressure on the tower being maintained at approximately 50 mm. Hg.

The vapors pass off the stripping tower into the surface condenser 15 at the rate of 750 pounds per hour where they are condensed, the steam passing to the catchall and finally to the barometric condenser. Five hundred pounds of the condensed low boiling fatty acid is returned to the top of the stripping tower as reflux while 250 pounds is removed as product.

Within the stripping tower, the main portion of the feed stock flows downward over several stripping trays, being thoroughly stripped of non-condensable gases and air, moisture, and low boiling impurities.

The dried and de-aerated feed stock flows to the main fractionating tower through line 18. A pressure of 2 mm. Hg is maintained at the top of the tower while the pressure at the base is not substantially greater than 32 mm. Hg. The temperature at the base of the tower is maintained at about 482° F. Due to the fact that all of the unsaturated acid is still with the bottoms, the entire bottom mass boils at approximately the same temperature as the pure acid. No steam is required in the fractionating tower.

Six thousand pounds per hour of palmitic acid vapor issues from the top of the fractionating tower and is condensed in the surface condenser 22, 5000 pounds of the condensate being pumped back to the top tray of the fractionating tower as reflux and 1000 pounds being pumped to storage as finished product. The bottoms, which comprise about 70 to 80 per cent of the incoming stock, are drawn into the flash drum or chamber which is maintained at 2 mm. Hg or less and allowed to vaporize, the latent heat of vaporization being furnished by the sensible heat carried in the stock, no additional heat being required. It will be apparent that in this operation these bottoms will be lowered in temperature by vaporization in the flash drum. Twenty-five hundred pounds of the unsaturated acids are removed as vapors in the flash chamber and condensed in the surface condenser 29 from whence it is pumped to storage.

The bottoms from the flash chamber contain considerable quantities of unsaturated acids, the actual percentage being controlled at such an amount as to insure a very pure unsaturated cut; in other words, I avoid getting down too close to the non-volatile matter.

The bottoms (approximately 1500 pounds per hour) are pumped to the top tray of the bottom section of the stripping tower where they are met with a countercurrent of super-heated stripping steam which removes the volatile fatty acids and carries them up to the top section of the tower where they are condensed with the feed stock. The non-volatile matter passes downward over the stripping trays and is removed from the base of the tower, the amount of super-heated steam being regulated so as to give the desired stripping results (approximately 400 pounds per hour). This amount can be varied over fairly wide limits as the pressure in the fractionating tower is from 50 to 70 mm. Hg.

It will be noted that in the flow of the feed stock through the stripping tower, fractionating tower, and flash drum, no pumps are employed. Tower nozzles, valves and other fittings are reduced in number and sources of leakage are reduced.

With the new method as described, it is possible to obtain an extremely high vacuum at low costs. The flash chamber and the fractionating tower can readily be operated at pressures of 1 to 2 mm. Hg without the compression of steam because no low boiling materials, water, air and non-condensable gases are present, the steam being eliminated from the fractionating tower and the feed stock being de-aerated and dried in the stripping tower.

Relatively low temperatures can be employed by virtue of the removal of the fractions in the stepwise method. The unsaturated fraction is removed by a flash distillation step where no heat is applied during the vaporization stage.

The fatty acid remaining in the bottoms is stripped by means of a high ratio of steam at a point in the system where the steam does not interfere with the high vacuum operation. Efficient and thorough stripping is accomplished at low temperatures. The stripped fatty acid is returned to the feed stock directly and with no heat loss, the latent heat contained in the acid being utilized for removing the moisture and low boiling material in the feed stock. It will be noted that the unsaturated fraction is heated only in the fractionating tower. Since the moisture is removed from the feed stock, there is no surging within the fractionating tower, as would otherwise be produced through a variation in the moisture content of the stock.

While in the foregoing description of the process, I have set forth certain steps as desirable, it will be understood that a number of such steps may be omitted or carried on in different sequences without departing from the spirit of my invention.

The phrase "fatty acid-containing stock" as used herein and in the claims appended, is intended to include pure fatty acid mixtures and/or stock-containing fatty acids and glycerides, etc.

I wish it to be understood that I do not desire to be limited to the exact details of construction shown and described, for obvious modifications will occur to a person skilled in the art.

What is claimed is:

1. In a method for treating fatty acid-containing stock in which fresh charging stock is passed in a confined stream through a heating zone and into a fractionating zone maintained under pressure below atmospheric, the steps of withdrawing bottoms from said fractionating zone to a stripping zone, introducing in said stripping zone the steam necessary for stripping vapors from said bottoms, contacting said incoming heated fresh stock with the steam and stripped vapors from said stripping zone, removing said steam condensing portions of said stripped vapors and passing said condensate free of water together with the heated fresh charging stock to said fractionating zone.

2. In a process for treating fatty acid-containing stock involving the recovery of volatilized fractions from a fractionating zone maintained under pressure below atmospheric, the steps of withdrawing bottoms from the fractionating zone to a stripping zone, introducing steam in said stripping zone into said bottoms to strip vapors therefrom, preheating fresh stock in a confined stream, contacting said preheated fresh stock with the steam and stripped vapors from said stripping zone to condense at least a portion of said stripped vapors and to remove moisture from said fresh stock, removing said steam and moisture and passing said fresh stock and said condensate free of water to said fractionating zone.

3. In a method for treating fatty acid-containing stock in which volatilized fractions are recovered from a fractionating zone maintained under pressure below atmospheric, the steps of withdrawing bottoms from said zone, reducing the pressure upon said bottoms to remove a further volatile fraction therefrom, passing the bottoms to a stripping zone, introducing steam to strip vapors from said bottoms, passing fresh fatty acid-containing stock in a confined stream through a heating zone, contacting said fresh stock with the steam and stripped vapors from said stripping zone, condensing at least a portion of said stripped vapors, mixing the condensate free of water with said heated fresh stock and returning the same to said fractionating zone.

4. In a process for treating fatty-acid-containing stock in which desired fractions are recovered in a fractionating zone maintained under pressure below atmospheric, the steps of withdrawing bottoms from said fractionating zone and into a stripping zone, introducing steam into said bottoms to remove vapors therefrom, passing fresh stock in a confined stream through a heating zone, contacting said stock with the steam and stripped vapors from said stripping zone, condensing said stripped vapors, removing said steam, mixing the condensate free of water with said heated fresh stock and passing the same to said fractionating zone.

5. In a process for fractionating fatty acid-containing stock in which the stock is passed in a confined stream through a heating zone and to a fractionating zone, the steps of fractionating the stock substantially in the absence of steam and under pressure below atmospheric, removing the bottoms from said fractionating zone, introducing steam into said bottoms to strip the desired vapors therefrom, condensing said vapors, and returning the condensate free of water to said fractionating zone.

6. In a method for treating fatty acid-containing stock in which the stock is passed in a confined stream through a heating zone and to a fractionating zone maintained under pressure below atmospheric and from which volatilized fractions are recovered, the steps of withdrawing bottoms from said fractionating zone to a stripping zone not in open communication with said fractionating zone, introducing steam in said stripping zone and into said withdrawn bottoms to strip vapors therefrom, condensing at least a portion of said vapors, separating said condensate from said steam, and returning the condensate substantially free of water to said fractionating zone.

7. In a method for treating fatty acid-containing stock in which the stock is passed in a confined stream through a heating zone and to a fractionating zone maintained under pressure below atmospheric, the steps of withdrawing bottoms from said fractionating zone, flashing said bottoms under reduced pressure to remove volatile fractions thereof, withdrawing the bottoms to a stripping zone, introducing steam in said stripping zone to strip vapors from said bottoms, condensing at least a portion of said vapors, and returning said condensate free of steam to said fractionating zone.

8. In a method for treating fatty acid-containing stock in which the stock is passed in a confined stream through a heating zone and to a fractionating zone maintained under pressure below atmospheric, the steps of withdrawing bottoms from said fractionating zone to a stripping zone not in open communication with said fractionating zone, introducing steam into said withdrawn bottoms to strip the same, condensing at least a portion of the stripped vapors, and passing said condensate free of water into said fractionating zone.

9. In a method for treating fatty acid-containing stock in which fresh charging stock is passed in a confined stream through a heating zone and into a fractionating zone maintained under pressure below atmospheric, the steps of withdrawing bottoms from said fractionating zone to a stripping zone not in open communication with said fractionating zone, introducing in said stripping zone steam necessary for stripping vapors from said bottoms, contacting said incoming heated fresh stock with steam and stripping vapors from said stripping zone to remove the odoriferous volatile fractions of said charging stock, condensing portions of said stripped vapors removing said steam and passing said condensate free of water together with said stripped charging stock to said fractionating zone.

10. In a method for treating fatty acid-containing stock in which fresh charging stock is passed in a confined stream through a heating zone and into a fractionating zone maintained under pressure below atmospheric, the steps of withdrawing bottoms from said fractionating zone to a second fractionating zone, withdrawing a fatty acid fraction from said first-mentioned fractionating zone, withdrawing a fraction from said second fractionating zone, introducing in said second fractionating zone steam necessary for stripping vapors from said bottoms, contacting said incoming heated fresh stock with the steam and stripped vapors within said second fractionating zone, condensing within said second fractionating zone portions of said stripped vapors, removing the steam and the moisture from said fresh stock and passing said condensate and heated fresh charging stock free of water to said first-mentioned fractionating zone.

11. In a process for treating fatty acid-containing stock in which stock is passed through a fractionating zone, the step of withdrawing bottoms from said fractionating zone and introducing all the steam required for stripping said bottoms in a stripping zone separate from said fractionating zone, said fractionating zone being maintained under pressure below atmospheric, removing the steam from said stripping zone without permitting it to pass through said fractionating zone, condensing portions of said stripped vapors, and returning the condensate free of water to said fractionating zone.

12. In a process for treating fatty acid-containing stock, the steps of passing stock in a confined stream through a heating zone, passing the heated stock into a fractionating zone in which water vapors and odoriferous volatile fractions are removed from said stock, passing said stock free of said vapors and volatile fractions into a second fractionating zone not in open communication with said first fractionating zone and maintained under pressure below atmospheric, withdrawing bottoms from said second fractionating zone and stripping said bottoms with steam in a separate stripping zone, removing the steam from said stripping zone without permitting it to pass into said second-mentioned fractionating zone, condensing portions of said stripped vapors and returning the condensate free of water to said second-mentioned fractionating zone, and recovering from said second-mentioned fractionating zone fatty acid fractions having different boiling points.

13. In a process for fractionating fatty acid-containing stock in which the stock is passed in a confined stream through a heating zone and to a fractionating zone, the steps of fractionating the stock substantially in the absence of steam and under reduced pressure, removing the bottoms from said fractionating zone, introducing steam into said bottoms to strip the desired vapors therefrom, condensing said vapors and returning the condensate free of water to said fractionating zone, and withdrawing as pitch said bottoms stripped of said vapors.

14. In a method for treating stock containing a mixture of fatty acids of different boiling points, the steps of subjecting said stock to fractional distillation in a fractionating zone in the substantial absence of steam, maintaining a subatmospheric pressure in the upper portion of said zone, the pressure in the lower portion of said zone being subatmospheric but substantially higher than the pressure in the upper portion thereof, withdrawing a vaporous low boiling fatty acid fraction from the upper portion of said zone, condensing at least a portion of said vaporous low boiling fraction, returning at least a portion of the condensate to the upper portion of said zone as reflux liquid, withdrawing a high boiling liquid fatty acid fraction from the lower portion of said zone, passing said withdrawn liquid fraction into a flash zone having a lower pressure than the lower portion of said fractionating zone, the temperature of the fraction in said flash zone being at least substantially as high as the temperature of the same fraction when withdrawn from said fractionating zone whereby the more volatile portions of said withdrawn fraction are vaporized in said flash zone, and withdrawing a vaporous fatty acid fraction and a liquid fatty acid fraction from said flash zone.

15. In a method for treating stock containing a mixture of saturated and unsaturated fatty acids of different boiling points, the unsaturated fatty acids having relatively high boiling points, the steps of removing substantially all water from said stock, subjecting said stock to fractional distillation in a fractionating zone in the substantial absence of steam, maintaining a subatmospheric pressure at the upper portion of said zone, the pressure in the lower portion of said zone being subatmospheric but being substantially higher than the pressure in the upper portion thereof, withdrawing a vaporous low boiling fatty acid fraction from the upper portion of said zone, condensing at least a portion of said vaporous low boiling fraction, returning at least a portion of the condensate to the upper portion of said zone as reflux liquid, withdrawing from the lower portion of said zone a liquid high boiling fraction containing predominantly unsaturated fatty acids, passing said unsaturated fatty acid fraction into a flash zone having a lower pressure than the pressure in the lower portion of said fractionating zone adding heat to the flash zone to maintain the temperature of the fraction in said flash zone at least substantially as high as the temperature of the same fraction when withdrawn from said fractionating zone whereby the more volatile portions of said unsaturated fatty acid fraction are vaporized in said flash zone, and withdrawing a vaporous fatty acid fraction and a liquid fatty acid fraction from said flash zone.

16. In a method for treating stock containing a mixture of saturated and unsaturated fatty acids of different boiling points, the unsaturated fatty acids having relatively high boiling points, the steps of removing substantially all water from said stock, subjecting said stock to fractional distillation in a fractionating zone in the substantial absence of steam, maintaining a pressure in the neighborhood of 2 mm. mercury at the upper portion of said zone, the pressure in the lower portion of said zone being in the neighborhood of 32 mm. mercury, withdrawing from the upper portion of said zone a vaporous low boiling fatty acid fraction, condensing at least a portion of said vaporous low boiling fraction, returning at least a part of the condensate to the upper portion of said zone as reflux liquid, withdrawing from the lower portion of said zone a liquid fatty acid fraction containing predominantly unsaturated fatty acids, passing said withdrawn liquid fraction into a flash zone having a pressure in the neighborhood of 2 mm. mercury adding heat to the flash zone to maintain the temperature of the fraction in said flash zone at least substantially as high as that in the lower portion of said fractionating zone whereby the more volatile portions of the unsaturated fatty acid fraction are vaporized in said flash zone, and withdrawing a vaporous fatty acid fraction and a liquid fatty acid fraction from said flash zone.

RALPH H. POTTS.